(12) United States Patent
Likhterman et al.

(10) Patent No.: US 12,054,168 B2
(45) Date of Patent: *Aug. 6, 2024

(54) LOGICAL CONFIGURATION OF VEHICLE CONTROL SYSTEMS BASED ON DRIVER PROFILES

(71) Applicant: Allstate Insurance Company, Northbrook, IL (US)

(72) Inventors: Aleksandr Likhterman, Wheeling, IL (US); Sunil Chintakindi, Menlo Park, CA (US); Harini Anand, Hawthorn Woods, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 751 days.

This patent is subject to a terminal disclaimer.

(21) Appl. No.: 17/063,178

(22) Filed: Oct. 5, 2020

(65) Prior Publication Data

US 2021/0016787 A1    Jan. 21, 2021

Related U.S. Application Data

(63) Continuation of application No. 16/017,090, filed on Jun. 25, 2018, now Pat. No. 10,793,164.

(51) Int. Cl.
*B60W 50/00* (2006.01)
*B60W 40/00* (2006.01)
(Continued)

(52) U.S. Cl.
CPC .......... *B60W 50/085* (2013.01); *B60W 40/09* (2013.01); *B60W 50/0098* (2013.01); *G06Q 40/08* (2013.01); *B60W 2050/0082* (2013.01)

(58) Field of Classification Search
CPC ............... B60W 50/085; B60W 40/09; B60W 50/0098; B60W 2050/0082;
(Continued)

(56) References Cited

U.S. PATENT DOCUMENTS

| 8,457,827 B1 | 6/2013 | Ferguson et al. |
| 9,120,484 B1 | 9/2015 | Ferguson et al. |

(Continued)

FOREIGN PATENT DOCUMENTS

| WO | WO-2016028228 A1 * | 2/2016 | ............. G06Q 50/00 |
| WO | 2017142917 A1 | 8/2017 | |

OTHER PUBLICATIONS

WO-2016028228 page numbers (Year: 2016).*
(Continued)

*Primary Examiner* — Rachid Bendidi
(74) *Attorney, Agent, or Firm* — Polsinelli PC

(57) ABSTRACT

Apparatuses, systems, and methods are provided for the logical configuration of vehicle control systems based on driver profiles. A vehicle control computer may identify driving behavior of a driver of a vehicle through vehicle operation data provided by one or more of vehicle sensors, a telematics device, and a mobile device. Based on the driving behavior, the vehicle control computer may develop a first driving profile for the driver of the vehicle. The vehicle control computer transmit the first driving profile to a remote server storing driving profiles of a plurality of users. The vehicle control computer may download a second driving profile associated with a different driver from the remote server. The vehicle control computer may configure vehicle operations based off of the second driving profile associated with the different driver and may actuate vehicle operation based on the configuration.

17 Claims, 11 Drawing Sheets

(51) Int. Cl.
*B60W 40/09* (2012.01)
*B60W 50/08* (2020.01)
*G06Q 40/00* (2023.01)
*G06Q 40/08* (2012.01)

(58) Field of Classification Search
CPC . B60W 2510/0638; B60W 2510/0676; B60W 2510/22; B60W 2520/10; B60W 2520/105; B60W 2530/20; B60W 2530/209; B60W 2540/18; B60W 2540/20; B60W 2540/30; B60W 2556/45; G06Q 40/08

See application file for complete search history.

(56) References Cited

U.S. PATENT DOCUMENTS

| | | | |
|---|---|---|---|
| 9,229,905 | B1 | 1/2016 | Penilla et al. |
| 9,361,409 | B2 | 6/2016 | Kozloski et al. |
| 9,373,203 | B1* | 6/2016 | Fields .................. H04W 4/029 |
| 9,390,451 | B1 | 7/2016 | Slusar |
| 9,529,361 | B2 | 12/2016 | You et al. |
| 9,587,952 | B1 | 3/2017 | Slusar |
| 9,623,876 | B1 | 4/2017 | Slusar |
| 9,766,625 | B2 | 9/2017 | Boroditsky et al. |
| 9,816,827 | B1 | 11/2017 | Slusar |
| 10,024,684 | B2 | 7/2018 | Wang |
| 2013/0166098 | A1 | 6/2013 | Lavie et al. |
| 2014/0019167 | A1 | 1/2014 | Cheng et al. |
| 2014/0310788 | A1 | 10/2014 | Ricci |
| 2015/0248131 | A1 | 9/2015 | Fairfield et al. |
| 2016/0086397 | A1 | 3/2016 | Phillips |
| 2016/0101728 | A1 | 4/2016 | Chan |
| 2017/0036052 | A1 | 2/2017 | Wang |
| 2017/0067385 | A1 | 3/2017 | Hunt |
| 2017/0297586 | A1 | 10/2017 | Li |
| 2017/0305437 | A1 | 10/2017 | Onorato et al. |
| 2017/0313322 | A1 | 11/2017 | Onorato et al. |
| 2017/0355377 | A1 | 12/2017 | Vijaya Kumar et al. |
| 2017/0369052 | A1* | 12/2017 | Nagy .................. B60W 30/14 |
| 2018/0004211 | A1 | 1/2018 | Grimm et al. |
| 2018/0107216 | A1 | 4/2018 | Beaurepaire et al. |
| 2018/0130095 | A1* | 5/2018 | Khoury .............. G01C 21/3617 |
| 2018/0276485 | A1* | 9/2018 | Heck ........................ G06N 7/01 |

OTHER PUBLICATIONS

Fugiglandi, et al, "Driving Behavior Analysis through CAN Bus Data in a Uncontrolled Environment," Oct. 9, 2017. retrieved from https://arxiv.org/pdf/1710.04133.pdf, 11 pages.

Geng, et al, "Human-Driver Speed Profile Modeling for Autonomous Vehicle's Velocity Strategy on Curvy Paths," 2016 IEEE Intellient Vehicles Sympooium (IV), Gothenberg, Sweden, Jun. 19-22, 2016, 6 pages.

Al Shihabi, Talal Ahmad, et al, "A framework for modeling human-like driving behaviors for automous vehcles in driving simulators," Conference Paper, Jan. 2001, retrieved from www.https//www.researchgate.net/publication/220794224, 7 pages.

Pendleton, Scott Drew, et al, "Perception, Planning, Control, and Coordination for Autonomous Vehicles," Machines 2017. 5(1), 6; doi:10.3390, retrieved from http://www.mdpi.com/2075-1702/5/1/6, 54 pages.

Meiring, Gys Albertus Mathinus, et al, "A Review of Intelligent Driving Style Analysis Systems and Reated Artificial Intelligenge Algorithms," published Dec. 4, 2015, retrieved from http://www.mdpi.com/1424-8220/15/12/29822, 30 pages.

Sep. 13, 2019—(WO) International Search Report & Written Opinion—PCT/US19/38915.

Oct. 31, 2019—(US) Non-Final Office Action—U.S. Appl. No. 16/017,090, 21 pages.

Apr. 27, 2020—(US) Non-Final Office Action—U.S. Appl. No. 16/016,903, 31 pages.

Jun. 9, 2020—(US) Notice of Allowance—U.S. Appl. No. 16/017,090, 15 pages.

Sep. 22, 2020—(US) Notice of Allowance—U.S. Appl. No. 16/016,903, 8 pages.

Jan. 7, 2021—(US) Notice of Allowance—U.S. Appl. No. 16/016,906, 3 Pages.

International Preliminary Report on Patentability for International Application No. PCT/US2019/038915, mailed Jan. 7, 2021, 14 pages.

* cited by examiner

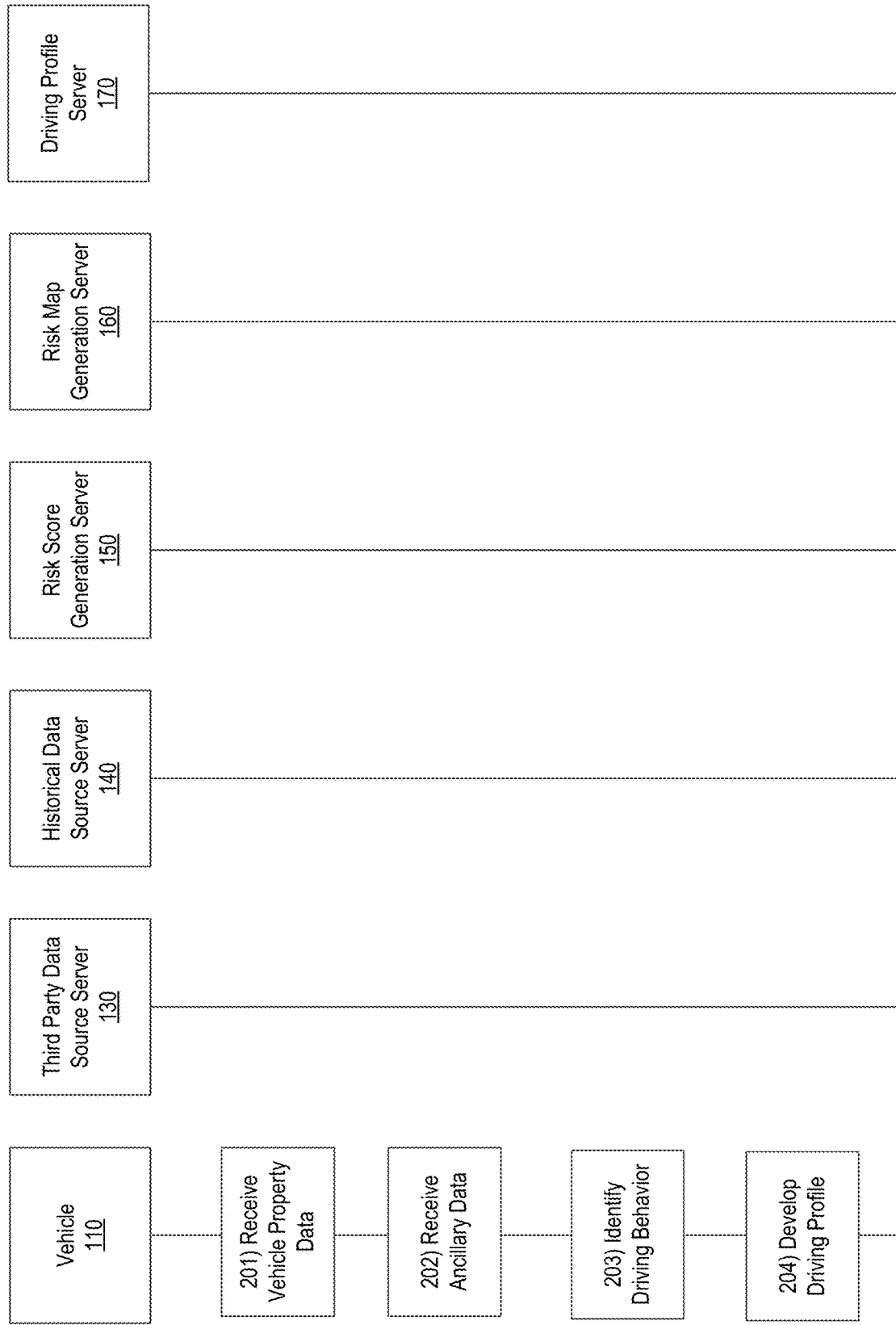

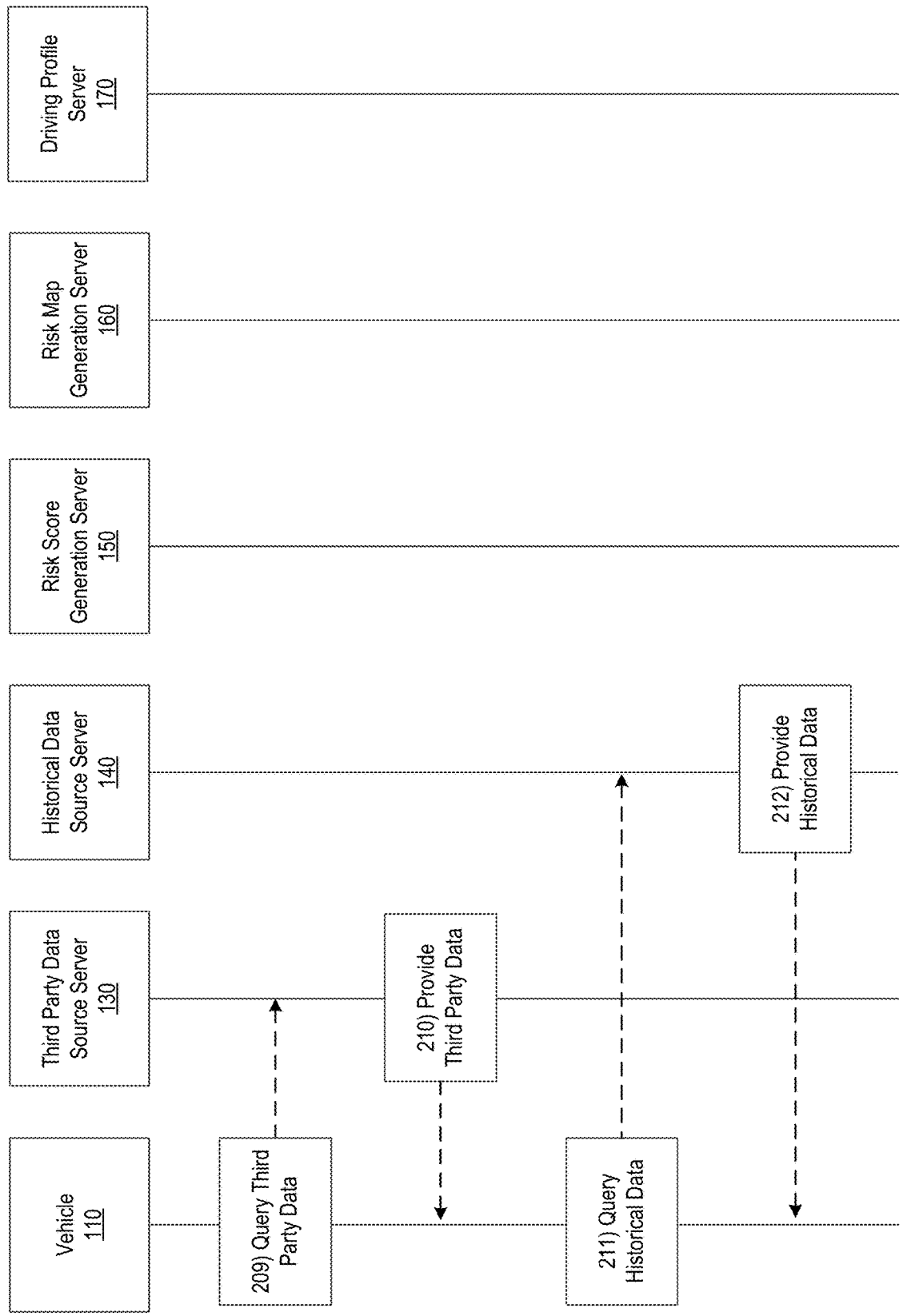

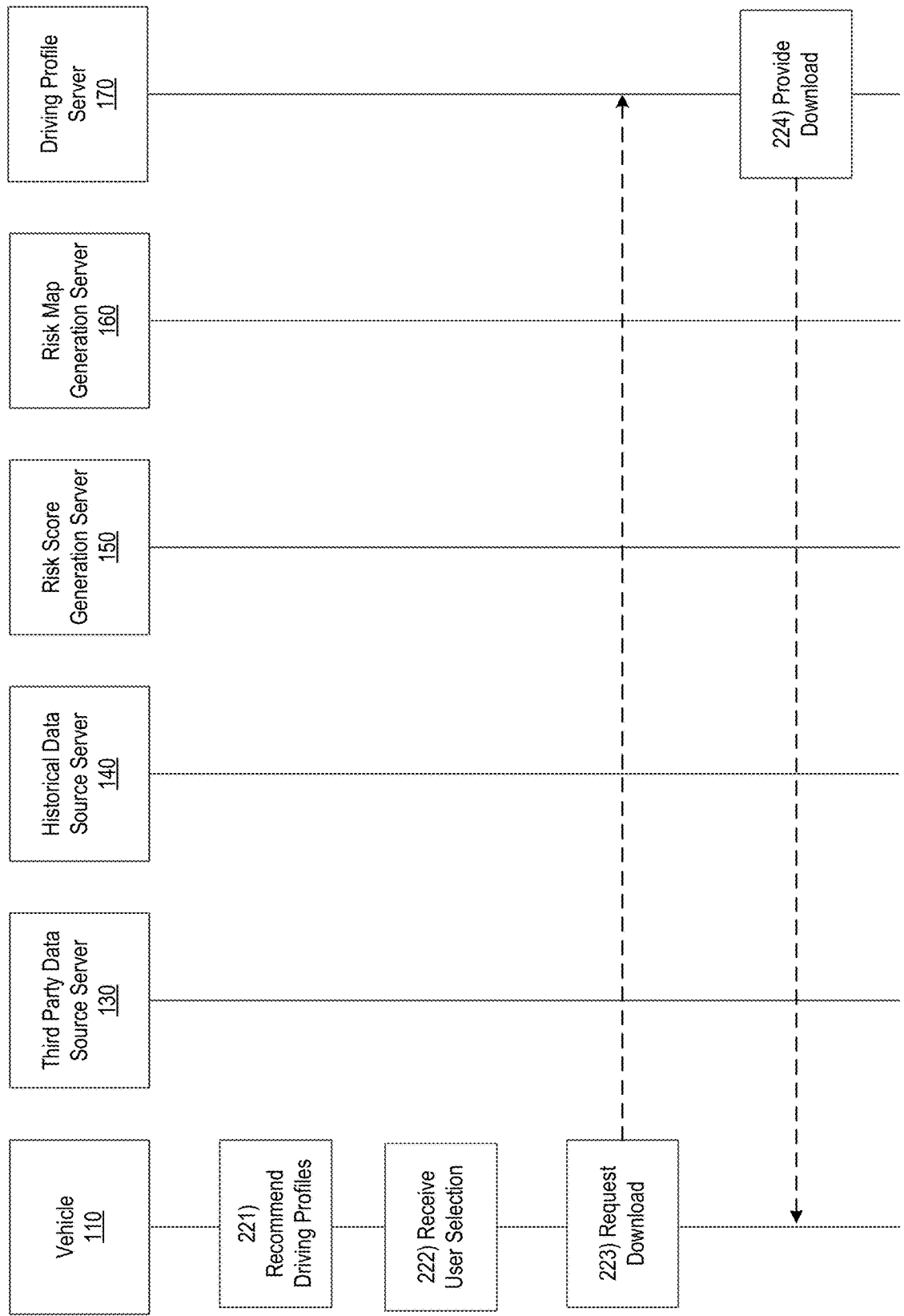

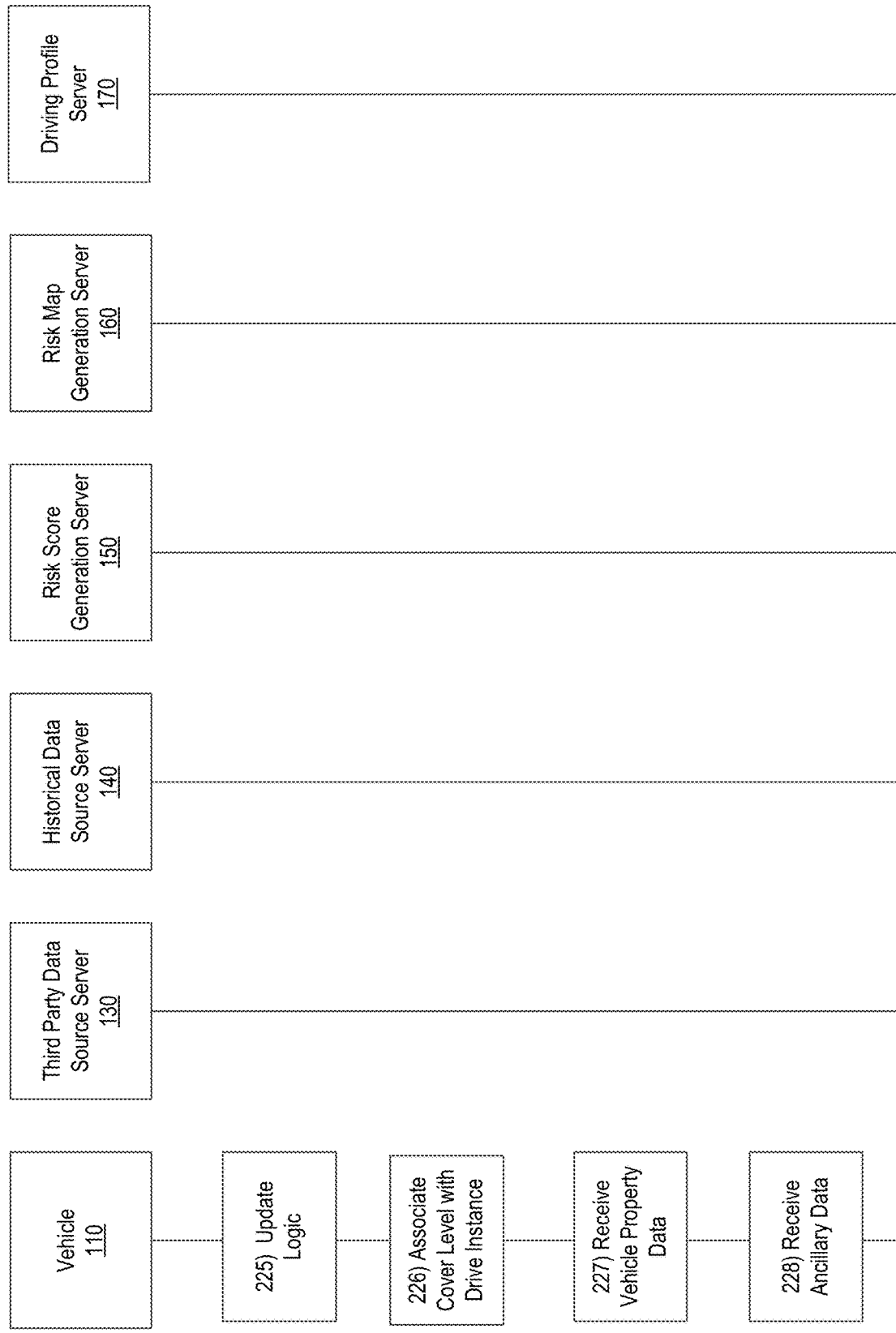

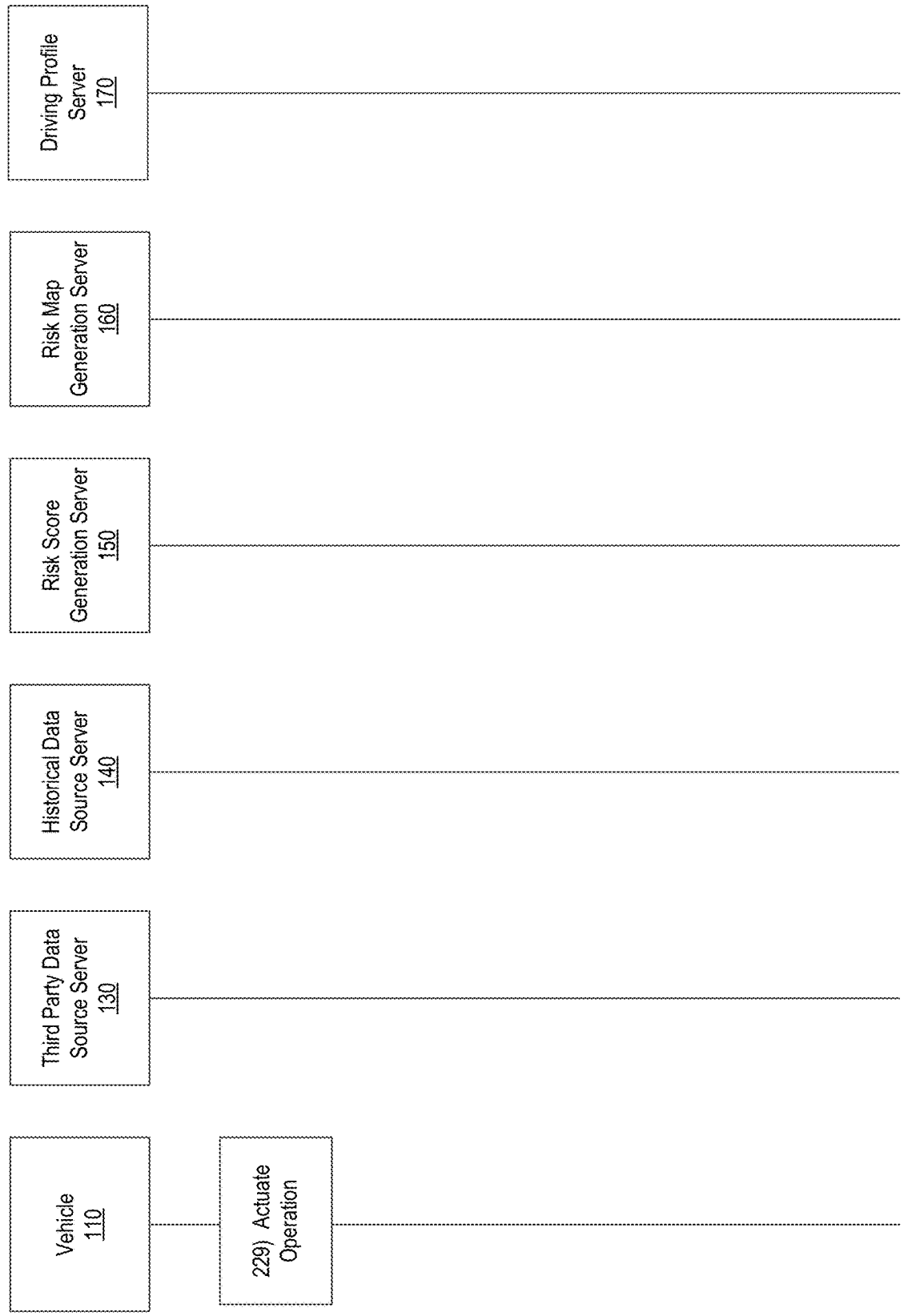

LOGICAL CONFIGURATION OF VEHICLE CONTROL SYSTEMS BASED ON DRIVER PROFILES

CROSS-REFERENCE TO RELATED APPLICATIONS

This application is a continuation of and claims priority to U.S. patent application Ser. No. 16/017,090, now U.S. Pat. No. 10,793,164, filed Jun. 25, 2018, and entitled "Logical Configuration of Vehicle Control Systems Based on Driver Profiles," which is related to U.S. patent application Ser. No. 16/016,903, filed Jun. 25, 2018, and entitled "Preemptive Logical Configuration of Vehicle Control Systems," the contents of each of which is incorporated herein, by reference, in its entirety.

TECHNICAL FIELD

Aspects described herein generally relate to autonomous, semi-autonomous, and non-autonomous vehicle control systems. More specifically, aspects relate to the logical configuration of vehicle control systems based on driver profiles.

BACKGROUND

Each year vehicle accidents account for thousands of deaths and millions of serious injuries. While autonomous and semi-autonomous car systems are poised to significantly reduce the number of vehicle accidents and, by extension, the number of accident related fatalities and injuries, such systems are often insufficient with respect to the usage of autonomous and/or semi-autonomous driving profiles based on driving circumstances on a trip-by-trip basis. Thus, arrangements for the recommendation of autonomous and/or semi-autonomous driving profiles based on anticipation of driving circumstances may be advantageous in preventing accidents and furthering motor vehicle safety.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations such as those described above, and to overcome other limitations that will be apparent upon reading and understanding the present specification, aspects described herein are directed to apparatuses, systems, and methods for the logical configuration of vehicle control systems based on driver profiles.

In accordance with one or more embodiments, a vehicle control computer may identify a driving behavior of a driver of a vehicle through vehicle operation data provided by one or more of vehicle sensors, a telematics device, and/or a mobile device. The vehicle control computer may develop a first driving profile for the driver of the vehicle based on the driving behavior. The vehicle control computer may transmit the first driving profile to a remote server storing driving profiles of a plurality of users. The vehicle control computer may download a second driving profile associated with a different driver from the remote server. The vehicle control computer may configure vehicle operations based off of the second driving profile associated with the different driver. The vehicle control computer may actuate vehicle operation based on the configuration.

In some embodiments, the vehicle control computer may identify one or more of acceleration behavior, braking behavior, and/or turning behavior based on acceleration data, braking data, and turning data provided by one or more of the telematics device, the on-board computer, and the mobile device.

In some embodiments, the second driving profile associated with the different driver is downloaded from the remote server through a driving profile store interface.

In some embodiments, the vehicle control computer may receive driving route information from the driver of the vehicle. The vehicle control computer may calculate a risk score for a driving route corresponding to the driving route information based on the driving route information. The vehicle control computer may identify the second driving profile based on the risk score matching a driving profile safety score of the second driving profile. The vehicle control computer may recommend the second driving profile to the driver of the vehicle for download.

In some embodiments, the vehicle control computer may identify a plurality of driving profiles based on the risk score matching a range of driving profile safety scores corresponding to the plurality of driving profiles. The vehicle control computer may recommend the second driving profile to the driver of the vehicle for download based on the driving profile safety score being closest to the risk score for the driving route.

In some embodiments, each of the plurality of driving profiles are associated with an insurance premium, and wherein the second driving profile is associated with a cheapest insurance premium.

In some embodiments, the downloading of the second driving profile causes the different driver to receive an insurance credit.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A-2H depict an illustrative event sequence for the logical configuration of vehicle control systems based on driver profiles in accordance with one or more aspects of the disclosure;

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Figure 1:
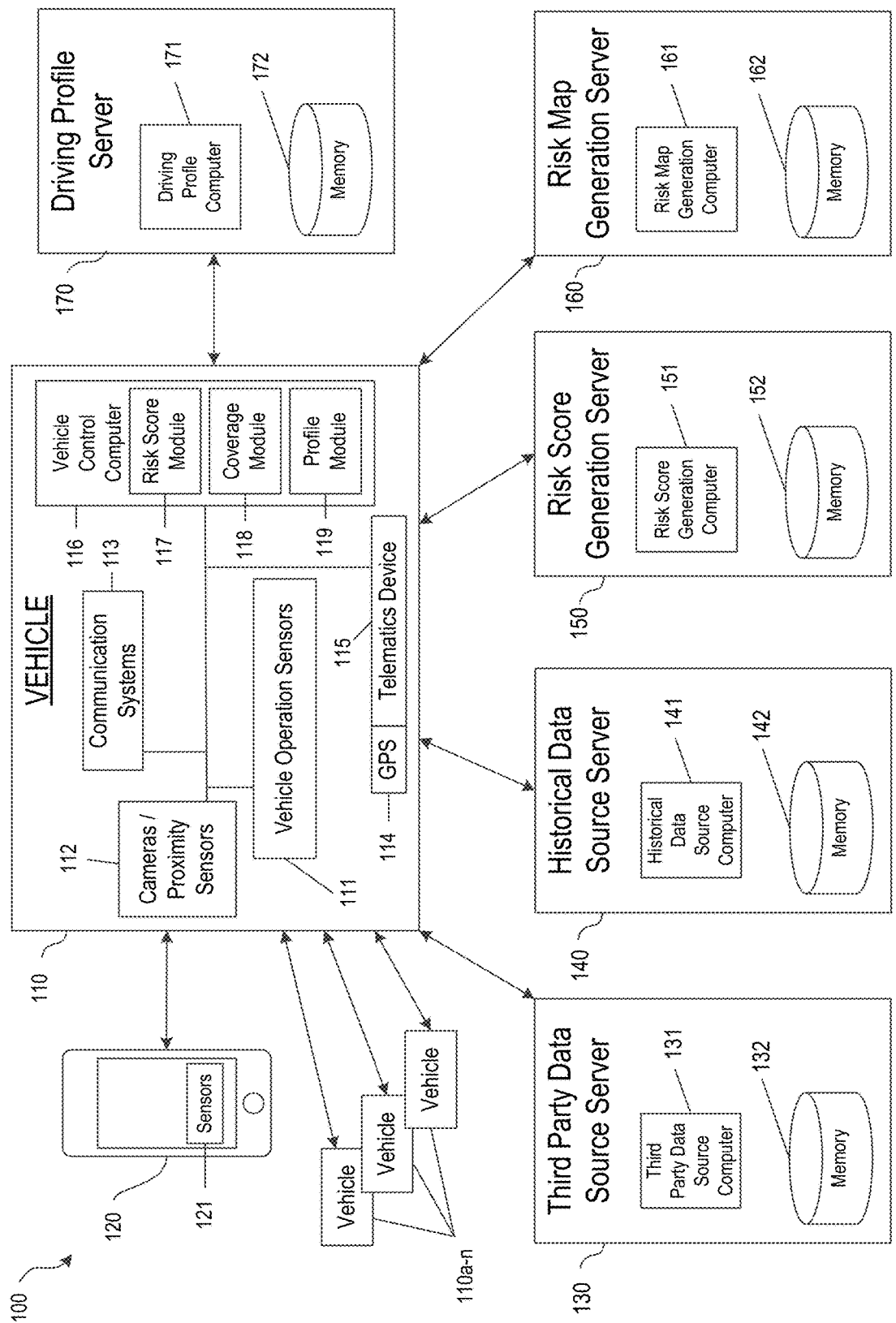
FIG. 1 depicts a diagram illustrating various example components of a vehicle control system according to one or more aspects of the disclosure.

FIG. 1 is a diagram illustrating various example components of a vehicle control system 100 according to one or more aspects of the disclosure. Vehicle control system 100 may include a vehicle 110, one or more additional vehicles 110a-n, a mobile computing device 120, a third party data source server 130, a historical data source server 140, a risk score generation server 150, a risk map generation server 160, and a driving profile server 170. Each component shown in FIG. 1 may be implemented in hardware, software, or a combination of the two. Additionally, each component of vehicle control system 100 may include a computing device (or system) having some or all of the structural components as computing device 401 described below in regard to FIG. 4.

As discussed above, vehicle control system 100 shown in FIG. 1 includes vehicle 110. Vehicle 110 may be an automobile, motorcycle, scooter, bus, van, truck, semi-truck, train, boat, recreational vehicle, or other vehicle. Vehicle 110 may further be an autonomous vehicle, semi-autonomous vehicle, or non-autonomous vehicle. Vehicle control system 100 may further include one or more additional vehicles 110a-n, which may be similar to vehicle 110. In some examples, vehicle 110 may include vehicle operation and environmental conditions sensors 111 capable of detecting, recording, and transmitting various vehicle performance and/or operational data and environmental conditions data. For example, sensors 111 may detect, store, and transmit data corresponding to the vehicle's speed, distances driven, rates of acceleration or braking, and specific instances of sudden acceleration, braking, swerving, and the like. Sensors 111 also may detect, store, and transmit data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, internal decibel levels, maintenance performed on the vehicle, and other data collected by the vehicle's computer systems.

Additional sensors 111 may detect, store, and transmit the environmental and external driving conditions data associated with vehicle 110 including external temperature, precipitation levels, precipitation type, presence of road ice and/or moisture, ambient light levels, presence of fog, and sun position affecting driver visibility. Sensors 111 also may detect, store, and transmit data relating to moving violations and the observance of traffic signals and signs by vehicle 110. Additional sensors 111 may detect, store, and transmit data relating to the maintenance of vehicle 110, such as the engine status, oil level, engine coolant temperature, odometer reading, the level of fuel in the fuel tank, engine revolutions per minute (RPMs), and/or tire pressure. Certain vehicle sensors 111 may determine when and how often vehicle 110 stays in a single lane or strays into other lanes.

Vehicle 110 also may include one or more cameras and proximity sensors 112 capable of recording additional conditions inside and/or outside of vehicle 110. Internal cameras 112 may detect conditions such as the number of the passengers in vehicle 110, and potential sources of driver distraction within the vehicle (e.g., pets, phone usage, and unsecured objects in the vehicle). External cameras and proximity sensors 112 may detect other nearby vehicles, traffic levels, road conditions, traffic obstructions, animals, cyclists, pedestrians, and other conditions that may factor into driving trip and/or driving data analyses.

Certain vehicle sensors 111 and/or cameras and proximity sensors 112 may determine when and how often vehicle 110 stays in a single lane or strays into other lanes. A Global Positioning System (GPS) 114 and/or locational sensors positioned inside vehicle 110, and/or locational sensors or devices external to vehicle 110 may be used to determine the lane position of vehicle 110, as well as road type (e.g., highway, entrance/exit ramp, residential area, two lane highway, four lane highway, etc.), road quality (e.g., paved, gravel, dirt, etc.), and other vehicle position/location data.

Vehicle sensors 111 and/or cameras and proximity sensors 112 may be configured to transmit the vehicle performance and operational data and environmental conditions data to one or more internal computing devices and/or systems including telematics device 115 and/or vehicle control computer 116. Additionally, vehicle sensors 111 and/or cameras and proximity sensors 112 may be configured to independently transmit the above-mentioned data to one or more external computing devices and/or systems including mobile device 120, third party data source server 130, historical data source server 140, risk score generation server 150, risk map generation server 160, and driving profile server 170. In some instances, the data transmission to the one or more external computing devices and/or systems may be performed via communication systems 113 and/or telematics device 115. In such cases, vehicle sensors 111 and/or cameras and proximity sensors 112 may be configured to transmit data to communications systems 113 and/or telematics device 115 which, in turn, may be configured to transmit the data to the one or more external computing devices and/or systems. The transmission of data, either externally or internally, from vehicle sensors 111 and/or cameras and proximity sensors 112 may occur seamlessly (e.g., live) and in real-time, or may occur in intermittent bursts (e.g., every 5 seconds, 10 seconds, 1 minute, etc.). In some examples, the transmission of data may occur in offset real-time wherein a time delay (e.g., 1 second, 3 seconds, 10 seconds, etc.) buffers the data transmission.

Communication systems 113 may be vehicle-based data transmission systems configured to transmit environmental surroundings and conditions and vehicle performance and operational data to external computing systems and/or other nearby vehicles and infrastructure, and to receive data from external computing systems and/or other nearby vehicles and infrastructure. In some examples, communication systems 113 may use the dedicated short-range communications (DSRC) protocols and standards to perform wireless communications between vehicles and/or external infrastructure such as bridges, guardrails, barricades, and the like.

Communication systems 113 may be implemented using other wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. In certain systems, communication systems 113 may include specialized hardware installed in vehicle 110 (e.g., transceivers, antennas, etc.), while in other examples the communication systems 113 may be implemented using existing vehicle hardware components (e.g., radio and satellite equipment, navigation computers) or may be implemented by software running on mobile computing device 120 of drivers and passengers within vehicle 110. Communication systems 113 may be configured to transmit data provided by vehicle sensors 111 and cameras and proximity sensors 112 to one or more external computing systems and/or vehicles 110a-n. Similarly, communications systems 113 may be configured to receive data from one or more external computing systems and/or vehicles 110a-n, which may be configured with similar sensors, cameras and/or other devices, as described above with respect to vehicle 110. Such data may be utilized in the preemptive logical configuration of vehicle control systems as described herein.

Figure 4:
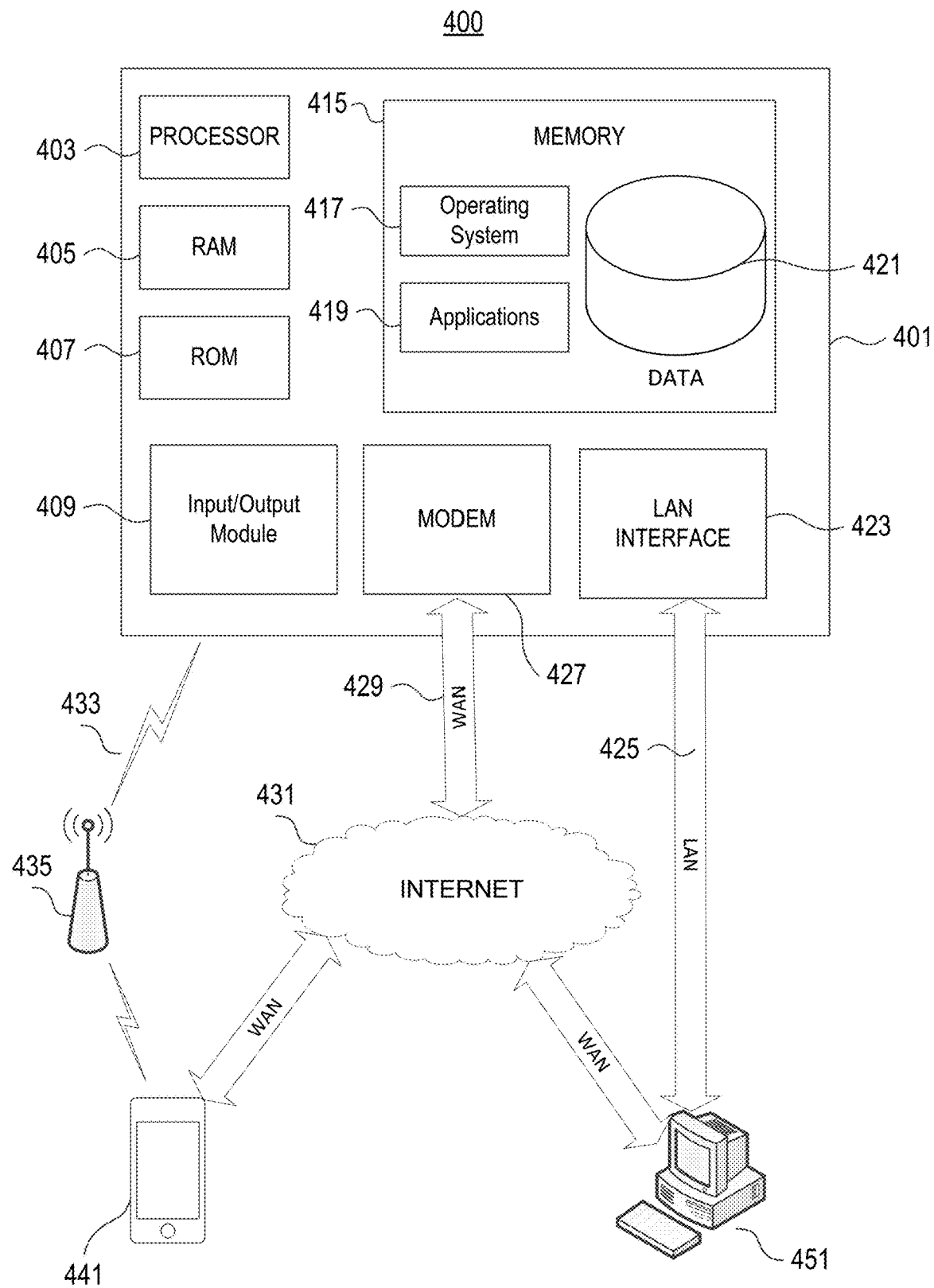
FIG. 4 depicts an example network environment and computing systems that may be used to implement aspects of the disclosure.

Telematics device 115 may be a computing device containing many or all of the hardware/software components as the computing device 401 depicted in FIG. 4. Telematics device 115 may receive vehicle performance and/or operational data and environmental conditions data from vehicle sensors 111 and cameras and proximity sensors 112, and may be configured to transmit the data to one or more external computing devices and/or systems over a wireless transmission network.

Telematics device 115 also may be configured to detect or determine additional types of data relating to real-time driving and the condition of vehicle 110. Telematics device 115 may store information relating to the type of vehicle 110, for example, as well as the make, model, trim (or sub-model), year, and/or engine specifications, and autonomous driving system specifications. Additionally, other information such as vehicle owner or driver information, insurance information, and financing information for vehicle 110 may be stored on telematics device 115.

In some instances, telematics device 115 may be configured to receive data from vehicle sensors 111 and cameras and proximity sensors 112 and to transfer the received data to external computing devices and/or systems including vehicles 110a-n, mobile device 120, third party data source server 130, historical data source server 140, risk score generation server 150, risk map generation server 160, and driving profile server 170. In other instances, vehicle sensors 111 and cameras and proximity sensors 112 may be configured to directly transmit data to external computing devices and/or systems (e.g., vehicles 110a-n, mobile device 120, third party data source server 130, historical data source server 140, risk score generation server 150, risk map generation server 160, and driving profile server 170) without using the telematics device. Thus, telematics device 115 may be optional in certain embodiments.

Vehicle control computer 116 may contain some or all of the hardware/software components as the computing device 401 depicted in FIG. 4, and may be configured to operate and/or control aspects of the driving of vehicle 110 in autonomous, semi-autonomous, and/or non-autonomous driving arrangements, including but not limited to, acceleration, braking, steering, and/or route navigation. Furthermore, vehicle control computer 116 may be configured to operate one or more internal vehicle control systems and/or components including at least a vehicle sound system, dashboard display and/or heads-up display system, interior lighting system, climate control system, door locking systems, and the like. Similarly, vehicle control computer 116 may be configured to operate one or more external vehicle control systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 116 may be further configured to activate and/or control one or more of vehicle operation sensors 111, cameras and/or proximity sensors 112, communication systems 113, GPS 114, telematics device 115, and/or or mobile device 120.

In order to perform the functions described herein, vehicle control computer 116 may be configured to receive, analyze, and act upon vehicle performance and operational data provided by vehicle sensors 111 and ancillary data provided by cameras and proximity sensors 112, mobile device 120, and/or third party data source server 130. Additionally, vehicle control computer 116 may be configured to receive, analyze, and act upon data provided by vehicles 110a-n, historical data source server 140, risk score generation server 150, risk map generation server 160, and/or driving profile server 170. Such data may be received through communication systems 113 and/or other on-board communication systems. In certain embodiments, vehicle control computer 116 may also be configured to receive, analyze, and act upon data provided by telematics device 115 and mobile device 120. Such data may be used by vehicle control computer 116 to perform autonomous driving functions, semi-autonomous driving functions described herein.

Stored in memory, vehicle control computer 116 may include at least risk score module 117, coverage module 118, and/or driving profile module 119. Risk score module 117 may store computer-executable instructions which, when executed by processors of vehicle control computer 116, may cause vehicle control computer 116 to calculate risk scores associated with driving danger areas and corresponding driving hazards based off of historical data, as will be described in further detail below. Coverage module 118 may store computer-executable instructions which, when executed by processors of vehicle control computer 116, may cause vehicle control computer 116 to calculate an insurance coverage level and/or premium for driving instances for vehicle 110 based on one or more of third party data provided by third party data source server 130, historical data provided by historical data source server 140, risk score data provided by risk score module 117 and/or risk score generation server 150, risk map data provided by risk map generation server 160, and/or selection of a particular driving profile from driving profile server 170. Driving profile module 119 may store computer-executable instructions which, when executed by processors of vehicle control computer 116, may cause vehicle control computer 116 to develop a driving profile associated with a user/driver of vehicle 110 based on vehicle operation data provided by vehicle operation sensors 111, GPS 114, telematics device 115, and/or mobile device 120, and/or environmental conditions and surroundings data provided by one or more of cameras and proximity sensors 112 and vehicles 110a-n.

In some embodiments, driving profile module 119 may store further instructions which may cause vehicle control computer 116 to communicate with driving profile server 170 through a driving profile store interface in order to facilitate the download of driving profiles to vehicle control computer 116. Additionally and/or alternatively, driving profile module 119 may also store instructions which may cause vehicle control computer 116 to identify driving profiles to recommend to a user/driver of vehicle 110 based on matching a driving profile safety score of driving profiles with route safety scores associated with a driving route corresponding to route information provided by a user/driver of vehicle 110, as described in further detail below.

In certain embodiments, mobile computing device 120 may be included within the vehicle 110 and may be used to independently collect vehicle driving data and/or to receive vehicle driving data from one or more vehicle and/or external computing devices and/or systems. Mobile computing device 120 may be, for example, a mobile phone, personal digital assistant (PDA), or tablet computer of the driver or passenger(s) of vehicle 110. Software applications executing on mobile device 120 may be configured to independently detect certain driving data. For example, mobile device 120 may be equipped with one or more accelerometers and/or GPS systems (e.g., sensors 121) which may be accessed by software applications executing on mobile device 120 to determine vehicle location, speed, direction, and other basic driving data. As stated above, mobile computing device 120 may be configured to transmit the independently collected vehicle driving data and/or the received vehicle driving data and environmental conditions data to one or more internal and/or external computing devices and/or systems.

In other examples, software on the mobile device 120 may be configured to receive some or all of the driving data collected by vehicle sensors 111 and cameras and/or proximity sensors 112. Mobile computing device 120 may also be involved with aspects of autonomous and semi-autonomous driving, including receiving, collecting, and transmitting vehicle operational data regarding autonomous and semi-autonomous driving and autonomous and semi-autonomous driving relationships between multiple vehicles. Furthermore, mobile device 120 may be configured to perform the multi-dimensional risk score calculations described in further detail below.

Vehicle control system 100 may include third party data source server 130, containing some or all of the hardware/software components as the computing device 401 depicted in FIG. 4. Third party data source server 130 may comprise a third party data source computer 131 for receiving and/or processing third party data including current weather condition data, forecasted weather condition data, traffic flow data, road closure data, and/or other data affecting external driving conditions. Third party data source server 130 may also comprise memory 132 used to store the third party data collected by third party data source computer 131. Third party data source computer 131 may transmit the third party data to vehicle 110 for aiding in the logical configuration of vehicle control systems based on driver profiles as described herein.

System 100 may include historical data source server 140, containing some or all of the hardware/software components as the computing device 401 depicted in FIG. 4. Historical data source server 140 may comprise a historical data source computer 141 for receiving and/or processing historical data including insurance claims, accident reports, historical environmental surroundings and conditions and/or historical vehicle operations data and ancillary data associated with insurance claims and accident reports. Historical data source server 140 may also comprise memory 142 used to store the historical data collected by historical data source computer 141. Historical data source computer 141 may transmit the historical data to vehicle 110 for aiding in the performance of the preemptive logical configuration of vehicle control systems as described herein.

System 100 may include risk score generation server 150 containing some or all of the hardware/software components as the computing device 401 depicted in FIG. 4. Risk score generation server 150 may include hardware, software, and network components to receive data from one or more data sources, such as vehicle 110 (e.g., via communication systems 113, telematics device 115, vehicle control computer 116, etc.), one or more additional vehicles 110a-n, mobile computing device 120, third party data source 130, historical data source 140, risk map generation server 160, driving profile server 170, and other data sources. Risk score generation server 150 may include memory 152, which may include additional data for risk score generation server 150 to process and/or generate, for example, one or more risk scores. Risk score generation computer 151 may analyze data received from the various data sources. Risk score generation server 150 may initiate communication with and/or retrieve data from vehicle 110, one or more additional vehicles 110a-n, mobile computing device 120, third party data source 130, historical data source 140, risk map generation server 160, driving profile server 170, and other data sources wirelessly, or by way of separate computing systems over one or more computer networks (e.g., the Internet). In some instances, vehicle control computer 116 may include a risk score module 117 which may provide vehicle control computer 116 with a similar ability to generate one or more risk scores as compared to risk score server 150.

Risk scores may be determined for one or more of the data values determined by the vehicle sensors 111, cameras and/or proximity sensors 112, telematics device 115, mobile computing device 120, third party data source server 130, historical data source server 140, risk map generation server 160, driving profile server 170, and the like. For example, risk scores may be determined for one or more of the vehicle performance and/or operational data variables including vehicle speed, acceleration, breaking, and the like, one or more of the internal vehicle systems data variables including turn signal usage, hazard light usage, windshield wiper usage, and the like, one or more of the environmental conditions data variables including precipitation levels, precipitation types, ambient light levels, and the like (e.g., vehicle operator data and ancillary data). Additionally, risk scores may be determined for vehicle performance and/or operational data received from one or more additional vehicle 110a-n.

The calculation of the risk scores may be performed by risk score generation server 150 and/or risk score module 117. In calculating the risk scores, risk score generation server 150 and/or risk score module 117 may incorporate data provided by third party data source server 130 and/or historical data source server 140. In some examples, risk scores determined for each variable may be summed to determine an overall risk score. The risk score may be a number from 0 to 100 wherein 0 represents minimal risk and 100 represents maximum risk. Furthermore, the risk scores may be calculated seamlessly and in real-time based on changes in the vehicle performance and/or operational data, environmental conditions data, traffic data, route data, and the like as described above. The risk scores may only be calculated for data having an impact in the near short term (e.g., 5 seconds to 5 minutes).

In some arrangements, the calculation of the risk scores may be performed by risk score generation server 150 and/or risk score module 117 in relation to particular areas in the vicinity of vehicle 110 and/or particular areas along an intended route of vehicle 110. For example, risk score generation server 150 and/or risk score module 117 may identify a location of vehicle 110, and may calculate risk scores for one or more areas in the vicinity of vehicle 110, and/or one or more areas along an intended route of vehicle 110, known for driving hazards based on data provided by one or more of vehicles 110a-n, third party data source 130, historical data source 140, and/or risk map generation server 160. In some instances, the vicinity around the location of vehicle 110 may be defined by predetermined area and/or in relation to a driving route specified by a user/driver of the vehicle. The risk scores calculated by risk score generation server 150 and/or risk score module 117 may identify one or more danger areas in the vicinity of the location of vehicle 110 with known driving hazards.

System 100 may include risk map generation server 160, containing some or all of the hardware/software components as the computing device 401 depicted in FIG. 4. Risk map server 160 may include hardware, software, and network components to receive data from one or more data sources, such as vehicle 110 (e.g., via communication systems 113, telematics device 115, vehicle control computer 116, etc.), one or more additional vehicles 110a-n, mobile computing device 120, third party data source server 130, historical data source server 140, risk score generation server 150, driving profile server 170, and other data sources. Risk map server 160 may include memory 162, which may include additional data for risk map server 160 to generate, for example, one or more risk maps. Risk map computer 161 may analyze data received from the various data sources. Risk map server 160 may initiate communication with and/or retrieve data from vehicle 110, one or more additional vehicles 110a-n, mobile computing device 120, third party data source 130, historical data source 140, risk score generation server 150, driving profile server 170, and other data sources wirelessly, or by way of separate computing systems over one or more computer networks (e.g., the Internet).

In some arrangements, risk map generation server 160 may operate in tandem with risk score generation server 150 in order to produce a risk map corresponding to the vicinity around the location and/or intended route of vehicle 110. In particular, risk map generation server 160 may generate a dynamically alterable risk map which is populated by the totality of driving danger areas identified the risk scores calculated by risk score generation server 150. Vehicle control computer 116 and/or vehicle control systems of vehicle 110 may be configured by the risk map generated by risk map generation server 160. Based on the configuration, vehicle control computer 116 and/or vehicle control systems of vehicle 110 may identify whether or not a location of vehicle 110 corresponds to location associated with a risk score. If so, vehicle control computer 116 and/or vehicle control systems of vehicle 110 may prioritize assessment of environmental data to identify driving hazards corresponding to the risk score while the vehicle is in the driving danger area. In some instances, the risk map may be generated by risk map generation server 160 responsive to receiving an intended driving route of vehicle 110 from driver of vehicle 110.

Vehicle control system 100 may include driving profile server 170, containing some or all of the hardware/software components as the computing device 401 depicted in FIG. 4. Driving profile server 170 may comprise a driving profile computer 171 for receiving driving profile upload and/or download requests from vehicle control computers, including vehicle control computer 116. Furthermore, driving profile server 170 may also comprise memory 172 used to store the driving profiles collected by driving profile computer 171. Driving profile computer 171 may transmit driving profiles to vehicle 110 for the logical configuration of vehicle control systems.

In some instances, historical data source server 140, risk score generation server 150, risk map generation server 160, and driving profile server 170 may associated with a same computing device configured to perform the functionality of each of historical data source server 140, risk score generation server 150, risk map generation server 160, and driving profile server 170. In such instances, the historical data source processes may be performed by the computing device through execution of computer executable instructions stored in a historical data source model, the risk score generation processes may be performed by the computing device through execution of computer-executable instructions stored in a risk score generation module, the risk map generation processes may be performed by the computing device through execution of computer-executable instructions stored in a risk map generation module, and the driving profile processes may be performed by the computing device through execution of computer-executable instructions stored in a driving profile module. The computing device may have a memory which may store data commonly accessible between the historical data source module, risk score generation module, risk map generation module, and driving profile module.

Vehicle control computer 116 may pull data, seamlessly and in real-time, from any one, or combination of, one or more additional vehicles 110a-n, vehicle sensors 111, cameras and proximity sensors 112, GPS 114, telematics device 115, mobile device 120, third party data source server 130, historical data source server 140, risk score generation server 150, and/or risk map generation server 160. The data provided may enable vehicle control computer 116 to perform autonomous and semi-autonomous driving actions for vehicle 110 and/or provide one or more driving alerts based on the preemptive logical configuration of vehicle control systems as described herein.

FIGS. 2A-2H depict an illustrative event sequence for the logical configuration of vehicle control systems based on driver profiles in accordance with one or more illustrative aspects described herein. While the steps of the event sequence of FIGS. 2A-2H are described in a particular order, it should be understood that the steps may be performed in any order without departing from the scope of the disclosure provided herein. Furthermore, even though the event sequence is described as being performed by a particular arrangement of computing devices (e.g., vehicle control computer 116, third party data source server 130, historical data source server 140, risk score generation server 150, and risk map generation server 160, and driving profile server 170) the processes may be performed by a number of computing devices greater or less than those described in regard to FIGS. 2A-2H. For example, vehicle control computers 116, third party data source servers 130, historical data source servers 140, risk score generation servers 150, risk map generation servers 160, driving profile server 170, and other computing devices may be used in the logical configuration of vehicle control systems based on driving profiles without departing from the scope of the disclosure provided herein.

Referring to FIG. 2A, at step 201, vehicle control computer 116 may receive vehicle property data of a plurality of types associated with vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 121 included in mobile computing device 120. The received vehicle performance and operational data may be associated with the general driving behavior of a user/driver of vehicle 110 during vehicle operation. For example, the received vehicle performance and operational data may include at least the user/driver's typical driving speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide vehicle control computer 116 with vehicle make, model, and parts information. Alternatively, such information may be pre-stored in memory associated with vehicle control computer 116. The vehicle performance and operational data may be transmitted by vehicle sensors 111 to vehicle control computer 116 continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, mobile device 120 associated with a user/driver of vehicle 110 may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications). The internal vehicle conditions data and mobile device usage indication data may be provided to vehicle control computer 116 continuously and in real-time by vehicle sensors 111, cameras and proximity sensors 112, and mobile device 120.

In some instances, the vehicle property data may be received by vehicle control computer 116 during a particular driving instance of vehicle 110 and/or across a plurality of driving instances. Additionally and/or alternatively, the vehicle property data may be received by vehicle control computer 116 in instances in which vehicle 110 is operating in a semi-autonomous and/or non-autonomous driving mode.

At step 202, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 201, from the communication systems of one or more additional vehicles 110a-n. Vehicle control computer 116 may output a polling request via communication systems 113 for the vehicle performance and operational data and internal vehicle conditions data from one or more additional vehicles 110a-n. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110a-n. The vehicle performance and operational data and internal vehicle conditions data for one or more additional vehicles 110a-n may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 120, and/or third party data source server 130. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. The environmental conditions data, as determined by sensors 111, cameras and proximity sensors 112, mobile device 120, and/or historical data source server 140, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 120 (e.g., sensors 121 within the mobile device), a navigation system associated with vehicle control computer 116, and/or third party data source server 130. In particular, vehicle sensors 111 and cameras and proximity sensors 112 may provide traffic data to vehicle control computer 116 as immediately experienced by vehicle 110 in the area surrounding vehicle 110. Mobile device 120, via a navigation application, the on-board navigation system of vehicle control computer 116, and third party data source server 130 may provide vehicle control computer 116 with traffic data associated with the projected route of vehicle 110. Such traffic data may be provided to vehicle control computer 116 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 120 (e.g., crowd sourced navigation application). Road type and road quality data may be provided to vehicle control computer 116 continuously and in real-time.

In some instances, the ancillary data may be received by vehicle control computer 116 during a particular driving instance of vehicle 110 and/or across a plurality of driving instances. Additionally and/or alternatively, the ancillary data may be received by vehicle control computer 116 in instances in which vehicle 110 is operating in a semi-autonomous and/or non-autonomous driving mode.

In some instances, steps 201 and 202 may be performed sequentially. In other instances, steps 201 and 202 may be performed simultaneously.

At step 203, vehicle control computer 116 may identify a driving behavior of a user/driver of vehicle 110 based on the vehicle operation data received at step 201 and the ancillary data received at step 202. In some instances, the identification of the driving behavior of the user/driver of vehicle 110 may occur in relation to a particular driving instance and may be performed based on the vehicle operation data received at step 201 and the ancillary data received at step 202 relating to that particular driving instance. In other instances, however, the identification of the driving behavior may occur across a plurality of driving instances and may be based off of aggregate vehicle operation data received at step 201 and ancillary data received at step 202 relating to the plurality of driving instances. Additionally and/or alternatively, the driving behavior may be determined after a predetermined number of driving instances (e.g., 5 driving instances, 100 driving instances, and the line) based on the vehicle operation data received at step 201 and the ancillary data received at step 202 for the predetermined driving instances. In such cases, the driving behavior may be determined by vehicle control computer 116 after each driving instance, and then aggregated to identify an overall driving behavior after the predetermined number of driving instances has been achieved.

In identifying the driving behavior based on the vehicle operation data received at step 201 and the ancillary data received at step 202, vehicle control computer 116 may determine the manner in which the user/driver of vehicle 110 operates vehicle 110 under various circumstances. For example, vehicle control computer 116 may determine the user/driver's typical rate of acceleration, deceleration, turning, and so during driving instances in the rain, with traffic, with no traffic, in the morning, at night, etc. Similarly, vehicle control computer 116 may determine the user/driver's typical route taken to known locations (e.g., home, work, school, store, and the like), as well as the user/driver's average rate of velocity while driving during driving instances in the rain, with traffic, with no traffic, in the morning, at night, etc. Additionally and/or alternatively, other driving behaviors associated with the user/driver of vehicle 110 may be determined based on the vehicle operation data received at step 201 and the ancillary data received at step 202.

At step 204, vehicle control computer 116 may develop a driving profile for the user/driver of vehicle 110. In particular, vehicle control computer 116 may develop the driving profile for the user/driver of vehicle 110 based on the driving behavior identified at step 203. The driving profile may be a logical configuration for operation of vehicle 110 which may cause vehicle control computer 116 to operate vehicle 110, in an autonomous and/or semi-autonomous driving mode, in a manner similar to that of the user/driver of vehicle 110. In particular, the driving profile, when used to configure operation of vehicle 110, may cause vehicle control computer 116 to control operation of vehicle 110 in a manner resembling the driving behavior displayed by the user/driver of vehicle 110. For example, the driving profile may cause vehicle control computer 116 to cause vehicle 110 to accelerate, decelerate, turn, change lanes, follow speed limits and stop signs, etc., during driving instances in the rain, with traffic, with no traffic, in the morning, at night, etc., in a manner similar that of the user/driver of vehicle 110.

In some instances, in developing the driving profile for the user/driver of vehicle 110, the vehicle control computer 116 of vehicle 110 may calculate a driving profile safety score for the driving profile of the user/driver. The driving profile safety score may be a number from 0 to 100 wherein 0 represents the most risk and 100 represents minimal risk. The driving profile safety score may incorporate the vehicle operation data received at step 201 and the ancillary data received at step 202 and may represent how safely the driving profile is affect operations of vehicle 110 in a manner corresponding to how safely the user/driver of vehicle 110 operates vehicle 110 under various circumstances. For example, a driving profile of a user/driver who drives slowly, breaks gently, accelerates steadily, turns without significant g-force, gives a turn signal at every turn or lane change, stops at every stop sign, follows the speed limit, maintains a one car distance on the road, etc. may have a higher driving profile safety score than that of a driving profile of a different user/driver who drives fast, breaks aggressively, accelerates rapidly, turns with significant g-force, and etc.

Figure 2B:
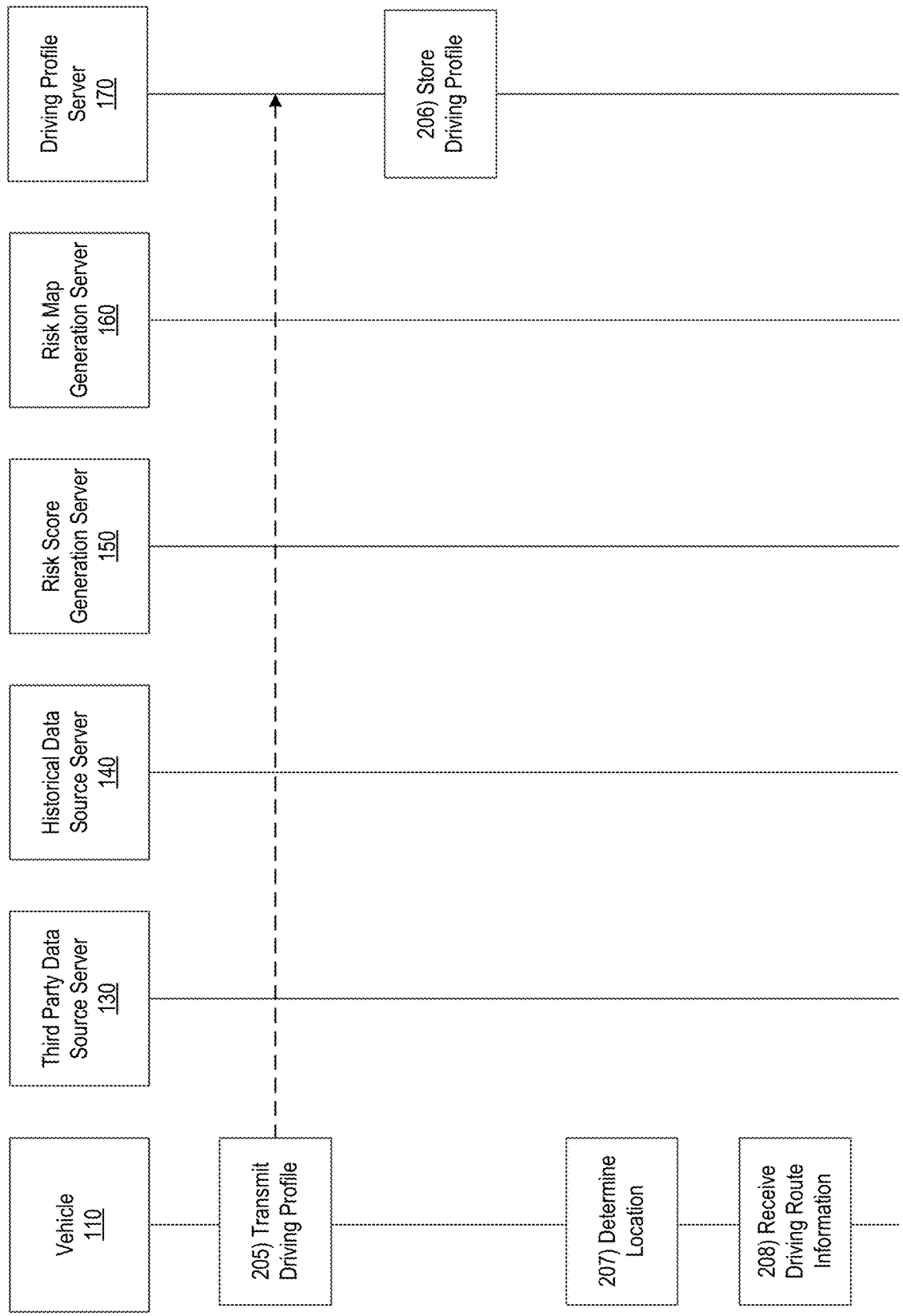

Referring to FIG. 2B, at step 205, vehicle control computer 116 may transmit the driving profile associated with the user/driver of vehicle 110 to driving profile server 170. In particular, vehicle control computer 116 may transmit the driving profile to driving profile server 170 by way of communication systems 113. In some instances, vehicle control computer 116 may transmit the driving profile to one or more of telematics device 115 and mobile device 120 which in turn may transmit the driving profile associated with the user/driver of vehicle 110 to driving profile server 170. At step 206, driving profile server 170 may store the driving profile in memory 172.

At step 207, vehicle control computer 116 of vehicle 110 may determine a location of vehicle 110. In particular, vehicle control computer 116 may activate GPS 114 of vehicle 110 to determine the location of vehicle 110. In some instances, vehicle control computer 116 may query and/or activate one or more of telematics device 115 and mobile device 120 in order to receive location data to determine the location of vehicle 110. The determining of the location of vehicle 110 may be performed by vehicle control computer 116 upon receipt of an unlock request from a key fob and/or key of vehicle 110, entry into vehicle 110 by a user/driver of vehicle 110, ignition of an engine of vehicle 110, and/or responsive to receipt of driving route information from a user/driver and/or passenger of vehicle 110. Additionally and/or alternatively, the determining of the location of vehicle 110 may be performed by vehicle control computer 116 responsive to termination of operation of vehicle 110 (e.g., turning off of the engine of vehicle 110), entry of the key fob, key, and/or mobile device 120 into the cabin of vehicle 110, and/or in response to other factors such as activation of a driver seat weight sensor, receipt of a location determination request provided by the user/driver and/or passenger, etc.

At step 208, vehicle control computer 116 of vehicle 110 may optionally receive driving route information from a user/driver and/or passenger of vehicle 110. In some instances, the driving route information may include a starting point and destination provided by the user/driver and/or passenger of vehicle 110 through an input/output interface associated with vehicle control computer 116. However, if the location of vehicle 110 was determined at step 201, then the user/driver and/or passenger of vehicle 110 may not need to provide starting point information. Additionally and/or alternatively, vehicle control computer 116 may receive the driving route information from the user/driver and/or passenger of vehicle 110 from mobile device 120.

Referring to FIG. 2C, at step 209, vehicle control computer 116 of vehicle 110 may query third party data source server 130 for environmental data. In particular, vehicle control computer 116 may query third party data source server 130 based on the location of vehicle 110 identified at step 207 in order to determine current weather condition data, forecasted weather condition data, traffic flow data, road closure data, and/or other data affecting external driving conditions of vehicle 110 in a vicinity around the location of vehicle 110. In instances in which the user/driver and/or passenger of vehicle 110 provided driving route information at step 208, vehicle control computer 116 may further include the driving route information in the query to third party data source server 130. Additionally and/or alternatively, vehicle control computer 116 may command and/or instruct one or more of telematics device 115 and mobile device 120 to request the environmental data from third party data source server 130.

At step 210, third party data source server 130 may provide the environmental data to vehicle control computer 116. In some instances, third party data source server 130 may provide the environmental data to one or more of telematics device 115 and mobile device 120 which in turn may provide the environmental data to vehicle control computer 116 of vehicle 110.

In the event that vehicle control computer 116 provided driving route information to third party data source server 130, third party data source server 130 may return environmental data to vehicle control computer 116 corresponding to the driving route information provided. In some instances, the environmental data provided by third party data source server 130 may be anticipatory to the driving route corresponding to the driving route information. As an illustrative, non-limiting example, the progression of vehicle 110 along the driving route may be projected to take four hours and involve passing through a first city at a two hour mark and a second city at a four hour mark. Third party data source server 130 may provide environmental data to vehicle control computer 116 which anticipates expected environmental data to be expected by vehicle 110 two hours into the future in relation to the first city and four hours into the future in relation to the second city. It is noted that the data provisioning may be done for the total continuity of the driving route, rather than on a city-by-city basis.

Alternatively, in the event that vehicle control computer 116 provided location information relating to vehicle 110 to third party data source server 130, third party data source server 130 may return environmental data to vehicle control computer 116 corresponding to a vicinity around the location of vehicle 110. In some instances, the vicinity may be a predetermined area surrounding the location of vehicle 110 which may be determined by previous driving habits of the user/driver of vehicle 110, available data, and/or based on certain radial distance (e.g., 5 miles, 10 miles, 100 miles, and the like) around the location of vehicle 110.

At step 211, vehicle control computer 116 of vehicle 110 may query historical data from historical data source server 140 to identify historical incident data. In particular, vehicle control computer 116 may query historical data source server 140 to identify historical incident data including insurance claims data, accident reports data, historical environmental surroundings and conditions and/or historical vehicle operations data and ancillary data associated with insurance claims and accident reports data, etc. The query provided to historical data source server 140 by vehicle control computer 116 may include one or more of the location information and/or route information corresponding to vehicle 110 and the environmental data provided by third party data source server 130. In some instances, vehicle control computer 116 may command and/or instruct one or more of telematics device 115 and mobile device 120 to request the historical data from third party data source server 130.

At step 212, historical data source server 140 may provide the historical data to vehicle control computer 116. In some instances, historical data source server 140 may provide the historical data to one or more of telematics device 115 and mobile device 120 which in turn may provide the historical data to vehicle control computer 116 of vehicle 110.

In the event that vehicle control computer 116 provided driving route information to historical data source server 140, historical data source server 140 may return historical data to vehicle control computer 116 corresponding to the driving route information provided. Alternatively, in the event that vehicle control computer 116 provided location information relating to vehicle 110 to historical data source server 140, historical data source server 140 may return historical data to vehicle control computer 116 corresponding to a vicinity around the location of vehicle 110.

Figure 2D:
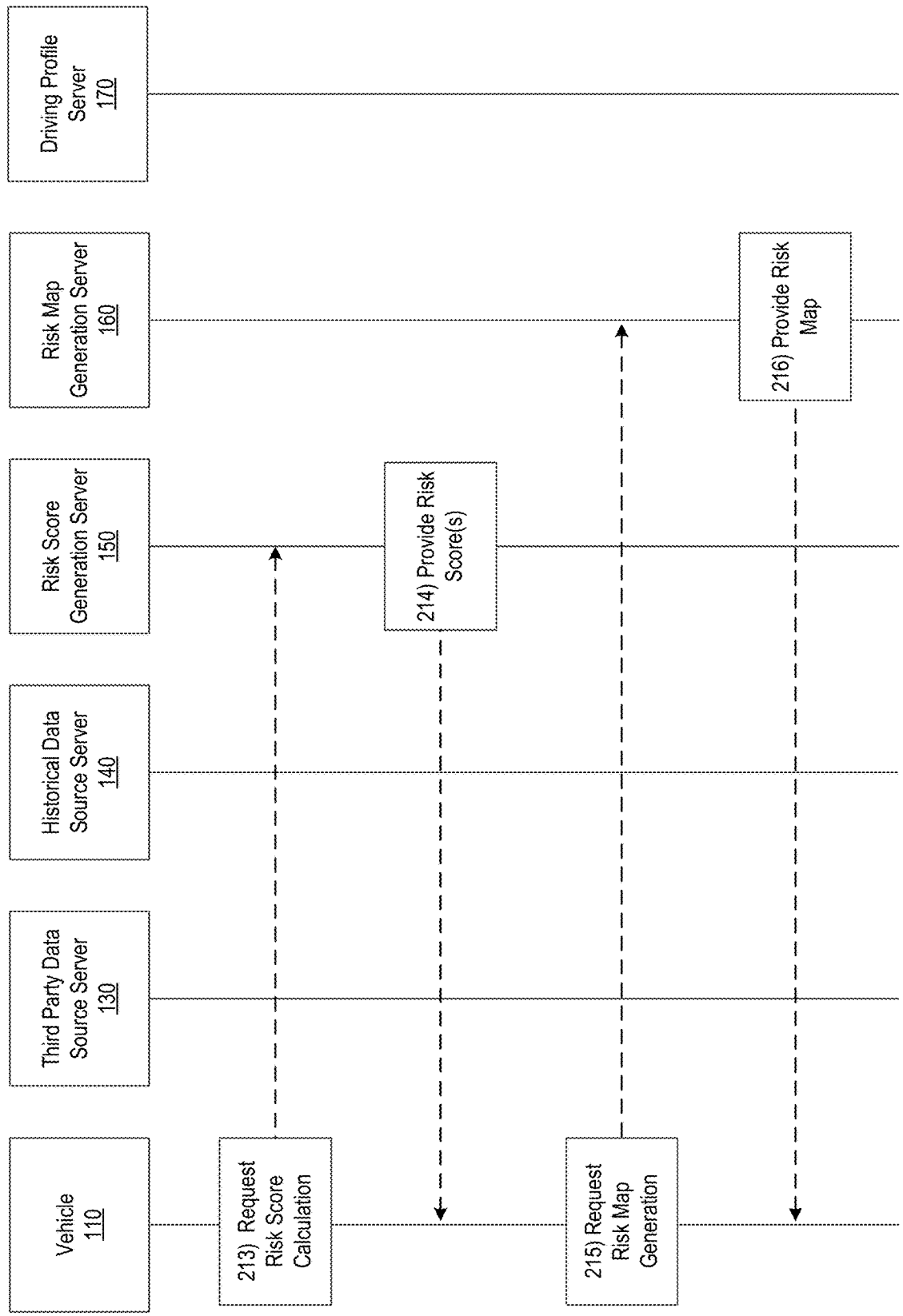

Referring to FIG. 2D, at step 213, vehicle control computer 116 may request risk score calculation from risk score generation server 150. In some instances, the request for risk score calculation may from vehicle control computer 116 to risk score generation server 150 may include one or more of the location of vehicle 110 determined at step 207, driving route information received at step 208, environmental data received at step 210, and historical data received at step 212.

At step 214, risk score generation server 150 may calculate one or more risk scores based on one or more of the location of vehicle 110 determined at step 207, driving route information received at step 208, environmental data received at step 210, and historical data received at step 212 and may transmit the one or more risk scores to the vehicle 110. In some instances, however, one or more risk scores may be calculated locally at vehicle 110 by vehicle control computer 116. In such instances, processors of vehicle control computer 116 may execute one or more computer-executable instructions corresponding to risk score module 117 which may cause vehicle control computer 116 to calculate one or more risk scores based on one or more of the location of vehicle 110 determined at step 207, driving route information received at step 208, environmental data received at step 210, and historical data received at step 212. In arrangements where vehicle control computer 116 calculates a risk score for each of the one or more danger areas and/or corresponding driving hazards, steps 213 and 215 may not be performed.

At step 215, vehicle control computer 116 of vehicle 110 may request risk map generation from risk map generation server 160. In doing so, vehicle control computer 116 may provide the risk score data generated at step 214 to risk map generation server 160. Alternatively, in instances in which risk scores are calculated at risk score generation server 150 in an arrangement in which risk score generation server 150 and risk map generation server 160 are configured as modules sharing the same computing device, vehicle control computer 116 may only provide a risk map generation request to the computing device storing the risk score generation module and risk map generation module.

At step 216, risk map generation server 160 may calculate a risk map which incorporates each of the one or more risk scores and may provide the calculated risk map to vehicle control computer 116.

Figure 2E:
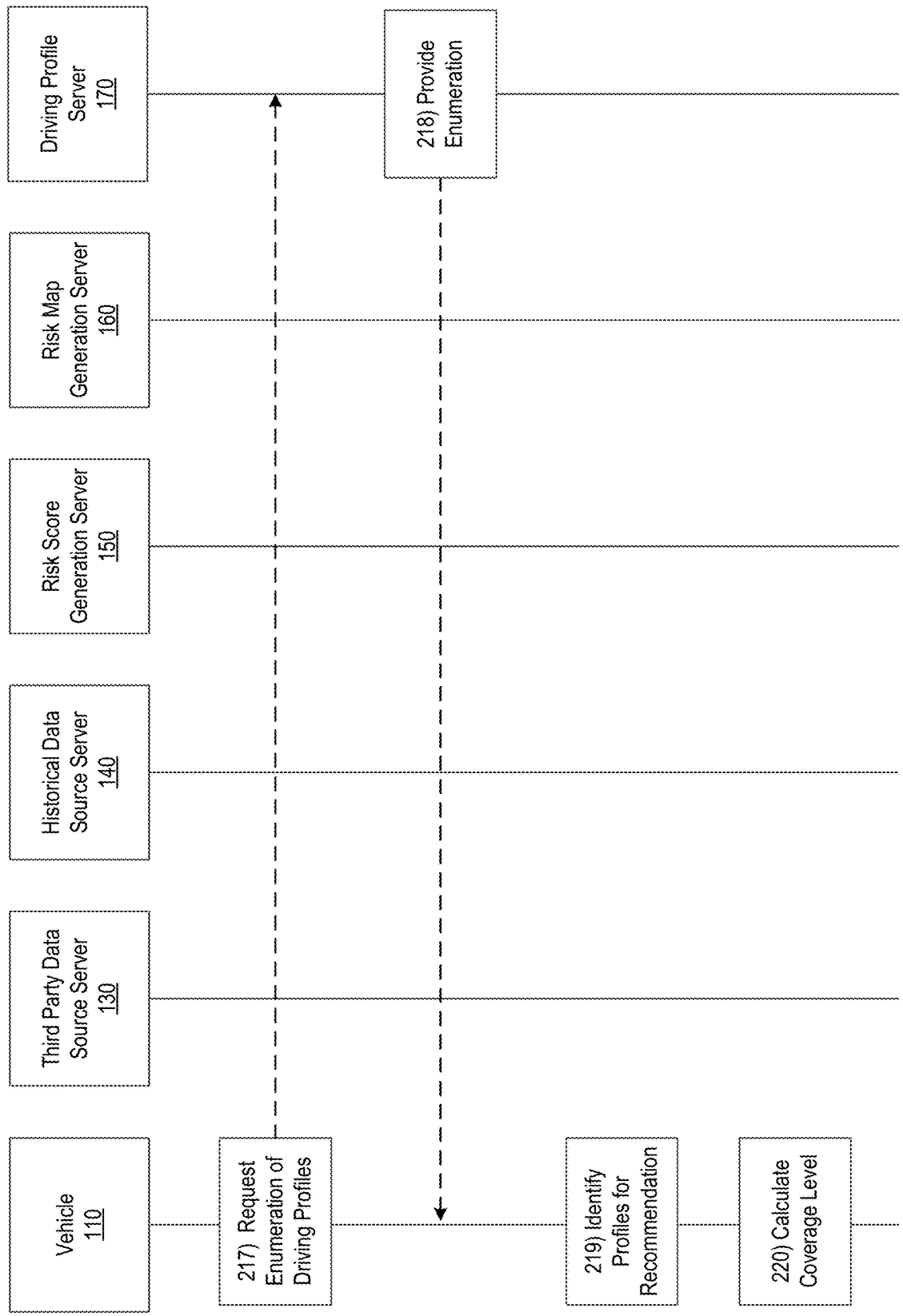

Referring to FIG. 2E, at step 217, vehicle control computer 116 may request enumeration of driving profiles available for download to the user/driver of vehicle 110 from driving profile server 170. In some instances, the enumeration request may include one or more of the location of vehicle 110 determined at step 207, driving route information received at step 208, environmental data received at step 210, and historical data received at step 212. Additionally and/or alternatively, the enumeration request may further include information corresponding to the make, model, and parts information of vehicle 110. Furthermore, the enumeration request may specify whether vehicle 110 is an autonomous, semi-autonomous, or non-autonomous vehicle, in addition to the Society of Automotive Engineers (e.g., SAE) automation level capacity (e.g., level 0-level 5). In some instances, the enumeration request may further include an indication of the autonomous operation firmware of vehicle 110, as well as an indication of the last servicing of vehicle operation sensors 111 and cameras and proximity sensors 112 of vehicle 110.

At step 218, driving profile server 170 may perform the enumeration of driving profiles requested by vehicle control computer 116 and provide the enumeration to vehicle control computer 116. In some instances, the performance of the enumeration by driving profile server 170 may be based off of the information provided by vehicle control computer 116 in requesting enumeration. For example, driving profile server 170 may perform the enumeration based on information corresponding to the make, model, and parts information of vehicle 110, whether vehicle 110 is an autonomous, semi-autonomous, or non-autonomous vehicle, the SAE level of vehicle 110, the indication of the autonomous operation firmware of vehicle 110, and the indication of the last servicing of vehicle operation sensors 111 and cameras and proximity sensors 112 of vehicle 110. The enumeration performed by driving profile server 170 may return the driving profiles available to be downloaded to vehicle control computer 116 and used to configure vehicle operation of vehicle 110.

At step 219, vehicle control computer 116 may identify a driving profile (e.g., a second driving profile) associated with a user/driver different than the user/driver of vehicle 110 for recommendation to the user/driver of vehicle 110 based on the enumeration of available driving profiles for download to vehicle control computer 116 provided by driving profile server 170 at step 219. In performing the identification, vehicle control computer 116 may compare driving profile safety scores corresponding to each of the driving profiles yielded during the enumeration performed by driving profile server 170 with the risk score provided by risk score module 117 and/or risk score generation server 150 at step 214, and/or the risk map provided by risk map generation server 160 at step 216. In comparing the driving profile safety scores corresponding to each of the driving profiles yielded during the enumeration with the risk score and/or risk map, vehicle control computer 116 may identify at least a driving profile (e.g., the second driving profile) for recommendation to the user/driver of vehicle 110 based on the driving profile safety scores matching the risk score and/or risk scores of the risk map. As an illustrative, non-limiting example, the risk score and/or risk scores of the risk map may be 70, and vehicle control computer 116 may identify at least a driving profile with driving profile safety score of 70. In instances in which no driving profile safety scores match that of the risk score and/or risk scores of the risk map, vehicle control computer may identify a driving profile with a driving profile safety score closest to the risk score and/or risk scores of the risk map.

In other instances, vehicle control computer 116 may identify one or more driving profiles for recommendation to the user/driver of vehicle 110. In particular, vehicle control computer 116 may identify one or more driving profiles for recommendation based on the enumeration of available driving profiles for download to vehicle control computer 116 provided by driving profile server 170 at step 219. In performing the identification, vehicle control computer 116 may compare driving profile safety scores corresponding to each of the driving profiles yielded during the enumeration performed by driving profile server 170 with the risk score provided by risk score module 117 and/or risk score generation server 150 at step 214, and/or the risk map provided by risk map generation server 160 at step 216. In comparing the driving profile safety scores corresponding to each of the driving profiles yielded during the enumeration with the risk score and/or risk map, vehicle control computer 116 may identify one or more driving profiles for recommendation to the user/driver of vehicle 110 based on the driving profile safety scores being within a certain predetermined range (e.g., +/−5, 10, 25, and the like) of the risk score and/or risk scores of the risk map. As an illustrative, non-limiting example, the risk score and/or risk scores of the risk map may be 70, and vehicle control computer 116 may identify one or more driving profiles with driving profile safety score being+/−25 of 70. In such instances, vehicle control computer may identify a first driving profile with a diving safety score of 95, a second driving profile with a driving safety score of 70, and a third driving profile with a driving profile safety score of 45. In some instances, vehicle control computer 116 may identify a particular driving profile which has a driving profile safety score closest to the risk score and/or risk score of the risk map.

At step 220, vehicle control computer 116 of vehicle 110 may calculate a coverage level and/or premium for each of the driving profiles identified for recommendation to the user/driver of vehicle 110 at step 219. In particular, processors of vehicle control computer 116 may execute one or more computer-executable instructions of coverage module 118 which may cause vehicle control computer 116 to calculate an insurance coverage level and/or premium for each of the driving profiles identified for recommendation to the user/driver of vehicle 110 at step 219.

In some instances, the calculation of the coverage level and/or premium for the identified driving profiles may incorporate environmental data provided by third party data source server 130 and/or historical data provided by historical data source server 140. In some instances, the calculation of the coverage level and/or premium may include risk score data provided by risk score module 117, risk score generation server 150 and/or risk map data provided by risk map generation server 160, and/or a level of operating autonomy of vehicle 110 (e.g., fully-autonomous, semi-autonomous, non-autonomous, and so on). In some instances, the calculation of the coverage level and/or premium for the driving instance of vehicle 110 may incorporate the SAE of vehicle 110. Additionally and/or alternatively, the calculation of the coverage level and/or premium for the identified driving profiles may further incorporate the deviation of the driving profile safety scores from the risk score and/or risk score of the risk map. For example, a driving profile with a driving profile safety score of the highest value and/or closest value to the risk score and/or risk score of the risk map may be associated with a cheapest insurance premium. Driving profiles with driving profile safety scores of the lowest values and/or furthest values from the risk score and/or risk score of the risk map may be associated with a higher insurance premiums.

Referring to FIG. 2F, at step 221, vehicle control computer 116 may recommend one or more driving profiles to the user/driver of vehicle 110. In some instances, vehicle control computer 116 may recommend a particular driving profile (e.g., second driving profile) to the user/driver of vehicle 110 based on the driving safety score of the driving profile matching the risk score and/or risk scores of the risk map. In other instances, vehicle control computer 116 may recommend a plurality of driving profiles, including a second driving profile, to the user/driver of vehicle 110 based on the driving safety scores of the plurality of driving profiles being within a predetermined range of the risk score and/or risk scores of the risk map. Additionally and/or alternatively, the recommendation of driving profiles to the user/driver of vehicle 110 may be performed by vehicle control computer 116 based on user preferences including one or more of a risk preference (e.g., deviation of the driving profile safety score from the risk score and/or risk scores of the risk map), user specified presets (e.g., smooth driving, get places quickly, fast and/or jerky driving, best view, and the like), and/or previously user favorited driving profiles.

At step 222, vehicle control computer 116 may receive a user selection of a driving profile by the user/driver of vehicle 110 from those recommended at step 221. The selection may occur through an input/output interface of vehicle control computer 116 and/or by way of mobile device 120. At step 223, vehicle control computer 116 may request download of the driving profile selected by the user/driver of vehicle 110 from driving profile server 170 and at step 224, driving profile server 170 may provide the driving profile to vehicle control computer 116. In some instances, in requesting download of the driving profile from driving profile server 170, vehicle control computer 116 may further provide an insurance credit to the user/driver corresponding to the selected driving profile (e.g., second driving profile). In other instances, the downloading of the driving profile may cause vehicle control computer 116 and/or driving profile server 170 to provide the different driver to provide an insurance credit to the user/driver corresponding to the downloaded driving profile.

Referring to FIG. 2G, at step 225, vehicle control computer 116 may update vehicle operation logic of vehicle 110 based on the driving profile downloaded from driving profile server 170 at step 224. The updating of the vehicle operation logic of vehicle 110 may cause vehicle control computer 116 to perform the one or more functions specified by the driving profile.

At step 226, vehicle control computer 116 may associate the coverage level and/or premium for the selected driving profile with a driving instance of vehicle 110. In doing so, vehicle control computer 116 may be configured to charge a cost corresponding to the coverage level and/or premium for the selected driving profile to a payment account associated with the user/driver of vehicle 110 and/or another person/entity associated with vehicle 110.

At step 227, vehicle control computer 116 may receive vehicle property data of a plurality of types associated with vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 121 included in mobile computing device 120. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide vehicle control computer 116 with vehicle make, model, and parts information. Alternatively, such information may be pre-stored in memory associated with vehicle control computer 116. The vehicle performance and operational data may be transmitted by vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, mobile device 120 associated with a user/driver of vehicle 110 may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications). The internal vehicle conditions data and mobile device usage indication data may be provided to vehicle control computer 116 continuously and in real-time by vehicle sensors 111, cameras and proximity sensors 112, and mobile device 120.

At step 228, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 218, from the communication systems of one or more additional vehicles 110a-n. Vehicle control computer 116 may output a polling request via communication systems 113 for the vehicle performance and operational data and internal vehicle conditions data from one or more additional vehicles 110a-n. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110a-n. The vehicle performance and operational data and internal vehicle conditions data for one or more additional vehicles 110a-n may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 120, and/or historical data source server 140. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 120 and/or historical data source server 140, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 120, and/or historical data source server 140, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 120 (e.g., sensors 121 within the mobile device), a navigation system associated with vehicle control computer 116, and/or historical data source server 140. In particular, vehicle sensors 111 and cameras and proximity sensors 112 may provide traffic data to vehicle control computer 116 as immediately experienced by vehicle 110 in the area surrounding vehicle 110. Mobile device 120, via a navigation application, the on-board navigation system of vehicle control computer 116, and historical data source server 140 may provide vehicle control computer 116 with traffic data associated with the projected route of vehicle 110. Such traffic data may be provided to vehicle control computer 116 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 120 (e.g., crowd sourced navigation application). Road type and road quality data may be provided to vehicle control computer 116 continuously and in real-time.

In some instances steps 227 and 228 may be performed sequentially. In other instances, steps 227 and 228 may be performed simultaneously.

Referring to FIG. 2H, at step 229, vehicle control computer 116 may actuate operation of vehicle 110. In particular, processors associated with vehicle control computer 116 may execute executable instructions based on the user-selected driving profile, which may cause the vehicle control computer 116 to take any of a plurality of driving actions and/or cause any of a plurality of driving alerts based on the vehicle operation data received at step 227 and/or the ancillary data received at step 228. Driving actions may include any one, or combination of, activating the brake, changing lanes, disabling mobile phone 120, disabling application use on mobile phone 120, disabling acceleration, reducing speed, turning on headlights, turning on emergency lights, honking vehicle horn, turning on windshield wipers, and the like. Detection alerts may include any one, or combination of, flashing interior lights, producing an audible sound in the interior of vehicle 110, suggesting an alternate route, providing an indication of upcoming issues on the dashboard and/or heads-up display unit, and the like.

Figure 3:
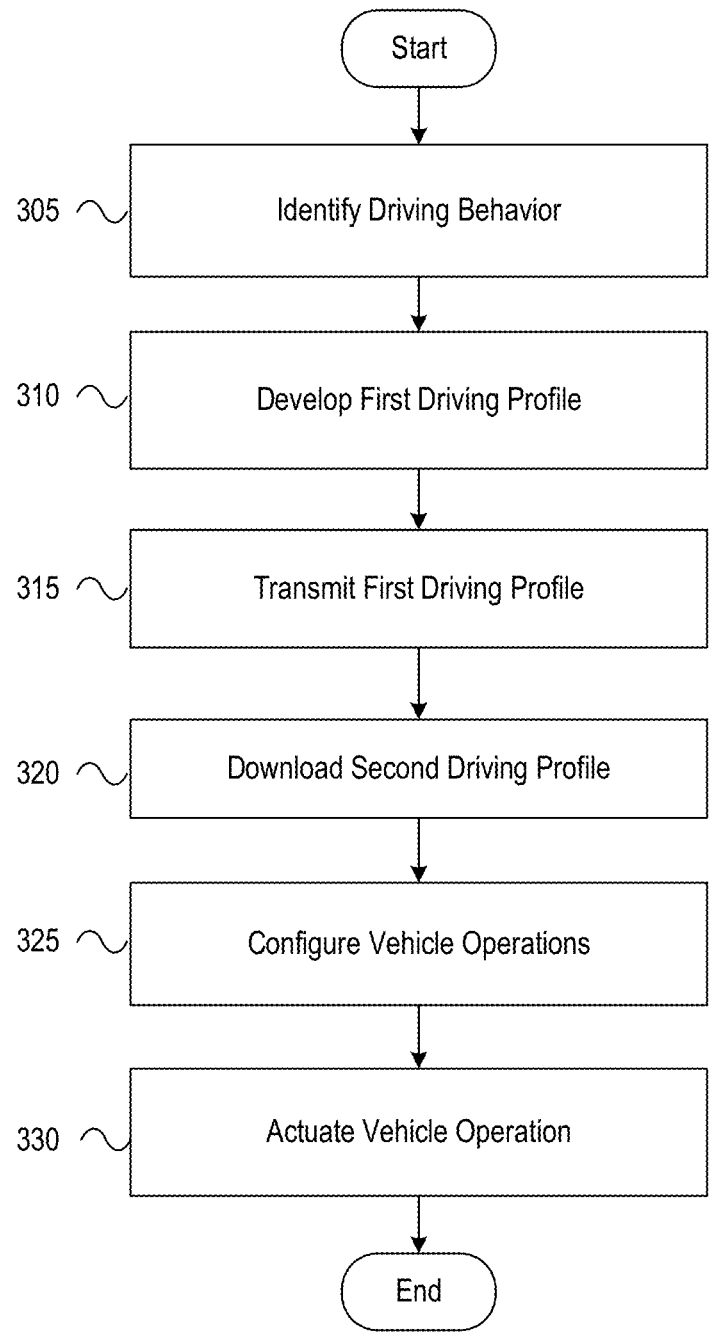
FIG. 3 depicts an illustrative method for the logical configuration of vehicle control systems based on driver profiles in accordance with one or more aspects of the disclosure.

FIG. 3 depicts an illustrative method for the logical configuration of vehicle control systems based on driving profiles according to one or more aspects of the disclosure. Referring to FIG. 3, at step 305, a vehicle control computer may identify driving behavior of a driver of a vehicle through vehicle operation data provided by one or more of vehicle sensors, a telematics device, and a mobile device. At step 310, the vehicle control computer may develop a first driving profile for the driver of the vehicle based on the driving behavior. At step 315, the vehicle control computer transmit the first driving profile to a remote server storing driving profiles of a plurality of users. At step 320, the vehicle control computer may download a second driving profile associated with a different driver from the remote server. At step 325, the vehicle control computer may configure vehicle operations based off of the second driving profile associated with the different driver. At step 330, the vehicle control computer may actuate vehicle operation based on the configuration.

FIG. 4 depicts an example network environment and computing system 400 that may be used to implement aspects of the disclosure. Computing system 400 may include a computing device 401, which may have a processor 403 for controlling overall operation of computing device 401 and its associated components, including RAM 405, ROM 407, input/output module 409, and memory unit 415. Computing device 401, along with one or more additional devices (e.g., terminals 441, 451) may correspond to any of multiple systems or devices, such as vehicle control systems and/or devices, configured as described herein for receiving data from various sources, generating driving profiles based on the received data, requesting download of driving profiles, configuring vehicle operation based on driving profiles, and actuating vehicle operation based on the configuration provided by the driving profiles.

Input/Output (I/O) module 409 may include a microphone, keypad, touch screen, and/or stylus through which a user of computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling computing device 401 to perform various functions. For example, memory unit 415 may store software used by computing device 401, such as an operating system 417, application programs 419, and an associated internal database 421. Memory unit 415 may include one or more of volatile and/or non-volatile computer memory to store computer-executable instructions, data, and/or other information. Processor 403 and its associated components may allow computing device 401 to execute a series of computer-readable instructions to receive data from various sources, generate driving profiles based on the received data, request download of driving profiles, configure vehicle operation based on driving profiles, and actuate vehicle operation based on the configuration provided by the driving profiles.

Computing device 401 may operate in a networked environment 400 supporting connections to one or more remote computers, such as terminals/devices 441 and 451. Computing device 401, and related terminals/devices 441 and 451, may include devices installed in vehicles, mobile devices that may travel within vehicles, or devices outside of vehicles that are configured to receive and process vehicle and other sensor data. Thus, computing device 401 and terminals/devices 441 and 451 may each include personal computers (e.g., laptop, desktop, or tablet computers), servers (e.g., web servers, database servers), vehicle-based devices (e.g., on-board vehicle computers, vehicle communication systems, sensors, and telematics devices), or mobile communication devices (e.g., mobile phones, portable computing devices, and the like), and may include some or all of the elements described above with respect to the computing device 401. The network connections depicted in FIG. 4 include a local area network (LAN) 425 and a wide area network (WAN) 429, and a wireless telecommunications network 433, but may also include other networks. When used in a LAN networking environment, computing device 401 may be connected to LAN 425 through a network interface or adapter 423. When used in a WAN networking environment, computing device 401 may include a modem 427 or other means for establishing communications over WAN 429, such as network 431 (e.g., the Internet). When used in a wireless telecommunications network 433, computing device 401 may include one or more transceivers, digital signal processors, and additional circuitry and software for communicating with wireless computing devices 441 (e.g., mobile phones, vehicle communication systems, vehicle sensors, and telematics devices) via one or more network devices 435 (e.g., base transceiver stations) in wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 419 used by computing device 401 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   receiving, by a computing device, vehicle performance and operational data associated with a first driver of a vehicle and collected by one or more sensors;
   generating, based on the vehicle performance and operational data, a first driving profile for the first driver;
   determining one or more locations associated with the vehicle;
   receiving a risk map associated with the one or more locations;
   comparing the risk map to driving profile safety scores corresponding to a plurality of driving profiles;
   selecting, from the plurality of driving profiles, one or more second driving profiles that have a driving profile safety score within a threshold range of one or more risk scores associated with the risk map, wherein the one or more second driving profiles are associated with one or more drivers different from the first driver;
   outputting a recommendation of the one or more second driving profiles for download;
   receiving a user selection of a driving profile from the one or more second driving profiles;
   causing downloading of the driving profile;
   configuring operation logic associated with the vehicle in accordance with the driving profile; and
   actuating operation of the vehicle in accordance with the driving profile.

2. The method of claim 1, wherein the vehicle performance and operational data comprises acceleration data, braking data, and turning data, and
   wherein the vehicle performance and operational data is used to identify one or more of: acceleration behavior of the first driver, braking behavior of the first driver, and turning behavior of the first driver.

3. The method of claim 1, further comprising:
   receiving driving route information associated with the vehicle,
   wherein determining the one or more locations associated with the vehicle is based on the driving route information.

4. The method of claim 1, wherein the one or more risk scores associated with risk map correspond to the one or more locations associated with the vehicle.

5. The method of claim 1, wherein comparing the risk map to the driving profile safety scores corresponding to the plurality of driving profiles comprises comparing the one or more risk scores associated with the risk map to the driving profile safety scores corresponding to the plurality of driving profiles.

6. The method of claim 1, further comprising:
   processing, based on receiving the user selection of the driving profile from the one or more second driving profiles recommended for download, an insurance credit for a second driver associated with the selected driving profile.

7. An apparatus comprising:
   one or more processors; and
   memory storing instructions that, when executed by the one or more processors, cause the apparatus to:
      receive vehicle performance and operational data associated with a first driver of a vehicle and collected by one or more sensors;
      generate, based on the vehicle performance and operational data, a first driving profile for the first driver;
      determine one or more locations associated with the vehicle;
      receive a risk map associated with the one or more locations;
      compare the risk map to driving profile safety scores corresponding to a plurality of driving profiles;
      select, from the plurality of driving profiles, one or more second driving profiles that have a driving profile safety score within a threshold range of one or more risk scores associated with the risk map, wherein the one or more second driving profiles are associated with one or more drivers different from the first driver;
      output a recommendation of the one or more second driving profiles for download;
      receive a user selection of a driving profile from the one or more second driving profiles;
      cause download of the driving profile;
      configure vehicle operation logic associated with the vehicle in accordance with the driving profile; and
      actuate operation of the vehicle in accordance with the driving profile.

8. The apparatus of claim 7, wherein the vehicle performance and operational data comprises acceleration data, braking data, and turning data, and wherein the vehicle performance and operational data is used to identify one or more of: acceleration behavior of the first driver, braking behavior of the first driver, and turning behavior of the first driver.

9. The apparatus of claim 7, wherein the instructions, when executed by the one or more processors, further cause the apparatus to:
receive driving route information associated with the vehicle,
determine the one or more locations associated with the vehicle based on the driving route information.

10. The apparatus of claim 7, wherein the one or more risk scores associated with risk map correspond to the one or more locations associated with the vehicle.

11. The apparatus of claim 7, wherein the instructions, when executed by the one or more processors, further cause the apparatus to:
compare the risk map to the driving profile safety scores corresponding to the plurality of driving profiles by comparing the one or more risk scores associated with the risk map to the driving profile safety scores corresponding to the plurality of driving profiles.

12. The apparatus of claim 7, wherein the instructions, when executed by the one or more processors, further cause the apparatus to:
process, based on receiving the user selection of the driving profile from the one or more second driving profiles recommended for download, an insurance credit for a second driver associated with the selected driving profile.

13. One or more non-transitory, computer-readable storage media storing instructions that, when executed by a computing device, cause the computing device to perform:
receiving vehicle performance and operational data associated with a first driver of a vehicle and collected by one or more sensors;
generating, based on the vehicle performance and operational data, a first driving profile for the first driver;
determining one or more locations associated with the vehicle;
receiving a risk map associated with the one or more locations;
comparing the risk map to driving profile safety scores corresponding to a plurality of driving profiles;
selecting, from the plurality of driving profiles, one or more second driving profiles that have a driving profile safety score within a threshold range of one or more risk scores associated with the risk map, wherein the one or more second driving profiles are associated with one or more drivers different from the first driver;
outputting a recommendation of the one or more second driving profiles for download;
receiving a user selection of a driving profile from the one or more second driving profiles recommended for download;
causing download of the driving profile;
configuring vehicle operation logic in accordance with the driving profile; and
actuating operation of the vehicle in accordance with the driving profile.

14. The one or more non-transitory, computer-readable storage media of claim 13,
wherein the vehicle performance and operational data comprises acceleration data, braking data, and turning data, and
wherein the vehicle performance and operational data is used to identify one or more of: acceleration behavior of the first driver, braking behavior of the first driver, and turning behavior of the first driver.

15. The one or more non-transitory, computer-readable storage media of claim 13, wherein the instructions, when executed by the computing device, further cause the computing device to perform:
receiving driving route information associated with the vehicle,
wherein determining the one or more locations associated with the vehicle is based on the driving route information.

16. The one or more non-transitory, computer-readable storage media of claim 13,
wherein the one or more risk scores associated with risk map correspond to the one or more locations associated with the vehicle, and
wherein comparing the risk map to the driving profile safety scores corresponding to the plurality of driving profiles comprises comparing the one or more risk scores associated with the risk map to the driving profile safety scores corresponding to the plurality of driving profiles.

17. The one or more non-transitory, computer-readable storage media of claim 13, wherein the instructions, when executed by the computing device, further cause the computing device to perform:
processing, based on receiving the user selection of the driving profile from the one or more second driving profiles recommended for download, an insurance credit for a second driver associated with the selected driving profile.

* * * * *